US012770502B2

(12) United States Patent
Prasad et al.

(10) Patent No.: US 12,770,502 B2
(45) Date of Patent: Oct. 20, 2026

(54) DE-NOISING DEVICE, DE-NOISING METHOD, AND COMPUTER-READABLE MEDIUM

(71) Applicant: NEC Corporation, Tokyo (JP)

(72) Inventors: Hemant Shivsagar Prasad, Tokyo (JP); Murtuza Petladwala, Tokyo (JP); Daisuke Ikefuji, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 9 days.

(21) Appl. No.: 18/728,888

(22) PCT Filed: Jan. 28, 2022

(86) PCT No.: PCT/JP2022/003243

§ 371 (c)(1),
(2) Date: Jul. 14, 2024

(87) PCT Pub. No.: WO2023/144984

PCT Pub. Date: Aug. 3, 2023

(65) Prior Publication Data

US 2025/0174119 A1 May 29, 2025

(51) Int. Cl.
*G08G 1/01* (2006.01)
*G08G 1/052* (2006.01)

(52) U.S. Cl.
CPC ........... *G08G 1/0116* (2013.01); *G08G 1/052* (2013.01)

(58) Field of Classification Search
CPC ............................. G08G 1/0116; G08G 1/052
See application file for complete search history.

(56) References Cited

U.S. PATENT DOCUMENTS

2016/0275788 A1 9/2016 Wu et al.
2017/0352262 A1* 12/2017 Xu ....................... G08G 1/0133
2021/0241615 A1* 8/2021 Narisetty ............ G08G 1/0141

FOREIGN PATENT DOCUMENTS

CN 107591002 A 1/2018
JP 2021-121917 A 8/2021
KR 10-2020-0069871 A 6/2020

OTHER PUBLICATIONS

International Search Report for PCT Application No. PCT/JP2022/003243, mailed on Apr. 5, 2022.
Written opinion for PCT Application No. PCT/JP2022/003243, mailed on Apr. 5, 2022.

* cited by examiner

*Primary Examiner* — Andrew J Cromer
(74) *Attorney, Agent, or Firm* — Sughrue Mion, PLLC

(57) ABSTRACT

To provide a de-noising device, a de-noising method and a computer readable medium capable of reducing the influence of noise included in waterfall data. A de-noising device comprises: a determination unit (241) for determining end coordinates of each of a plurality of trajectories extracted from waterfall data, the waterfall data being acquired by measuring signals from a plurality of sensing portions arranged along a road; an extension unit (242) for extending each trajectory by using the end coordinates so that a duration of time of each trajectory becomes a reference duration of time; a feature calculation unit (243) for calculating a feature of each extended trajectory; a detection unit (244) for detecting an outlier trajectory from the plurality of trajectories based on the features; a removing unit (245) for removing the outlier trajectory from the plurality of trajectories.

9 Claims, 18 Drawing Sheets

21 22 23

| Measurement Time & Date | Calculated Velocity (km/hr) | Traffic Counter Velocity (km/hr) |
|---|---|---|
| D1 T1 | 89.4 | 97 |
| D2 T2 | 93.4 | 95 |
| D3 T3 | 118.6 | 91 |
| D4 T4 | 150.6 | 95 |
| D5 T5 | 92.3 | 96 |
| D6 T6 | 101.3 | 92 |
| D7 T7 | 87.1 | 90 |
| D8 T8 | 87.1 | 90 |

Fig. 5

| Measurement Time & Date | Traffic Net Velocity (km/hr) |
|---|---|
| D1 T1 | 97 |
| D2 T2 | 95 |
| D3 T3 | 91 |
| D4 T4 | 150.6 |
| D5 T5 | 96 |
| D6 T6 | 92 |
| D7 T7 | 90 |
| D8 T8 | 90 |

| Measurement Time & Date | Traffic Net Velocity (km/hr) |
|---|---|
| D1 T1 | 97 |
| D2 T2 | 95 |
| D3 T3 | 91 |
| D4 T4 | 95 |
| D5 T5 | 96 |
| D6 T6 | 92 |
| D7 T7 | 90 |
| D8 T8 | 90 |

DE-NOISING DEVICE, DE-NOISING METHOD, AND COMPUTER-READABLE MEDIUM

This application is a National Stage Entry of PCT/JP2022/003243 filed on Jan. 28, 2022, the contents of all of which are incorporated herein by reference, in their entirety.

TECHNICAL FIELD

The present disclosure relates to a de-noising device, de-noising method, and a computer readable medium.

BACKGROUND ART

Optical fibers may be placed on roads (e.g., highways). The optical fiber comprises a plurality of sensing portions along a road. A distributed acoustic sensing (DAS) device attached to the optical fiber can detect vibration at the location where each sensing portion is located.

The distributed acoustic sensor acquires data called waterfall data. Waterfall data includes information about the time and location at which the vibration was detected. The velocity of a vehicle traveling on the road can be calculated based on the waterfall data (see Patent Literature 1).

CITATION LIST

Patent Literature

PTL 1: Japanese Unexamined Patent Application Publication No. 2021-121917

SUMMARY OF INVENTION

Technical Problem

When noise is included in the waterfall data, there is a problem that the accuracy of estimating an average velocity of the vehicles is lowered.

In view of the above circumstances, an object of the present disclosure is to provide a de-noising device, de-noising method, and a computer-readable medium for reducing the influence of noise included in the waterfall data.

Solution to Problem

A de-noising device according to the present disclosure comprising:

determination means for determining end coordinates of each of a plurality of trajectories extracted from waterfall data, the waterfall data being acquired by measuring signals from a plurality of sensing portions arranged along a road;

extension means for extending each trajectory by using the end coordinates so that a duration of time of each trajectory becomes a reference duration of time;

feature calculation means for calculating a feature of each extended trajectory;

detection means for detecting an outlier trajectory from the plurality of trajectories based on the features;

removing means for removing the outlier trajectory from the plurality of trajectories.

A de-noising method according to the present disclosure comprising:

determining end coordinates of each of a plurality of trajectories extracted from waterfall data, the waterfall data being acquired by measuring signals from a plurality of sensing portions arranged along a road;

extending each trajectory by using the end coordinates so that a duration of time of each trajectory becomes a reference duration of time;

calculating a feature of each extended trajectory;

detecting an outlier trajectory from the plurality of trajectories based on the features;

removing the outlier trajectory from the plurality of trajectories.

A non-transitory computer readable medium according to the present disclosure storing a program for causing a computer to perform processes including:

determining end coordinates of each of a plurality of trajectories extracted from waterfall data, the waterfall data being acquired by measuring signals from a plurality of sensing portions arranged along a road;

extending each trajectory by using the end coordinates so that a duration of time of each trajectory becomes a reference duration of time;

calculating a feature of each extended trajectory;

detecting an outlier trajectory from the plurality of trajectories based on the features;

removing the outlier trajectory from the plurality of trajectories.

Advantageous Effects of Invention

The de-noising device, the de-noising method and the computer readable medium according to the present disclosure can reduce the influence of noise included in the waterfall data.

BRIEF DESCRIPTION OF DRAWINGS

FIG. 5 is a table showing an average velocity calculated by the related traffic monitoring method.

DESCRIPTION OF EMBODIMENTS

Embodiments of the present disclosure will be described in detail below with reference to the drawings. In each drawing, the same or corresponding elements are denoted by the same reference sign, and duplicate explanations are omitted as necessary to clarify the description.

First Embodiment

Figure 1:
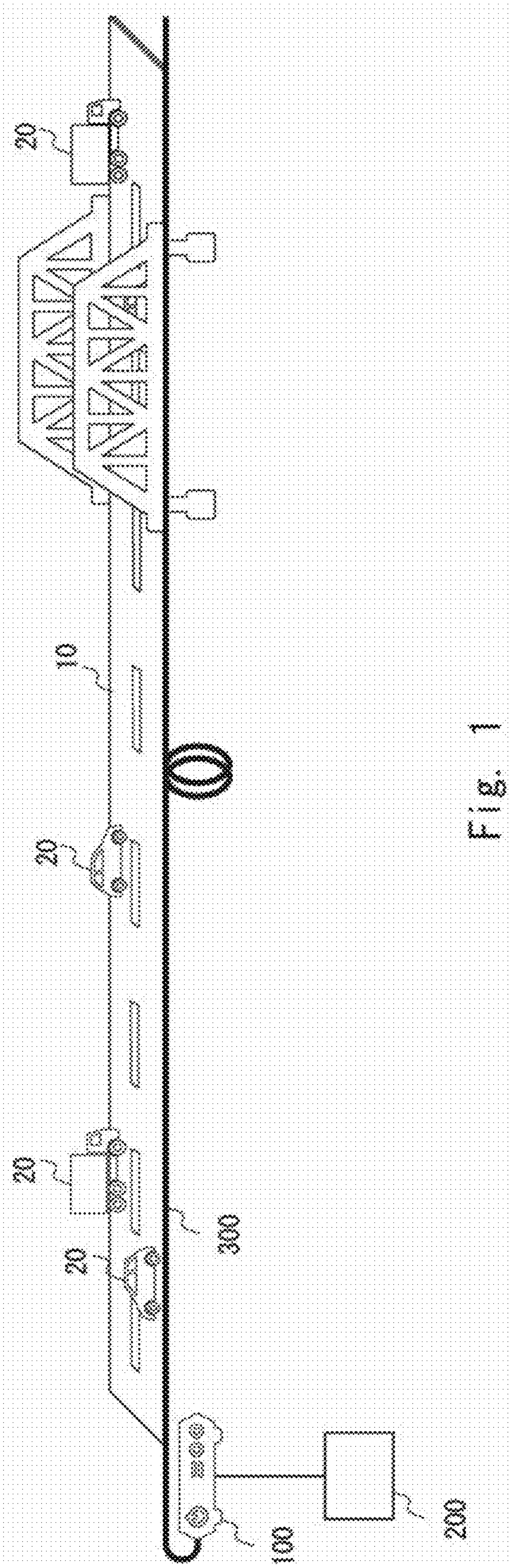
FIG. 1 is a schematic diagram illustrating a traffic monitoring system according to a first embodiment.

FIG. 1 is a schematic diagram of a distributed acoustic sensor (DAS) system 1000 along a road 10. The DAS system 1000 includes a traffic monitoring device 200 in communication with the DAS 100. The traffic monitoring device 200 is also referred to as a de-noising device. The DAS system 1000 further includes an optical fiber 300 connected to the DAS 100. The optical fiber 300 is laid along the road 10.

The road 10 may be a highway. The road 10 may include a plurality of lanes. A plurality of vehicles 20 run on the road 10.

The optical fiber 300 includes a plurality of sensing portions along the road 10. The sensing portions may be arranged at multiple equidistant points. When a vehicle 20 passes through the road 10, the vehicle 20 generates vibrations. These vibrations affect the propagation of light along the optical fiber 300. The DAS 100, connected to the optical fiber 300, sends an optical signal to the optical fiber 300, and detects the light returned from the optical fiber 300. The resulting data is called waterfall data. The water fall data is a time-distance graph. Vehicle trajectories can be extracted from the waterfall data, for example, by TrafficNET algorithm. Waterfall data provides traffic flow parameters such as the number of vehicles 20 on the road 10, an average vehicle velocity, and lane occupancy.

Figure 2:
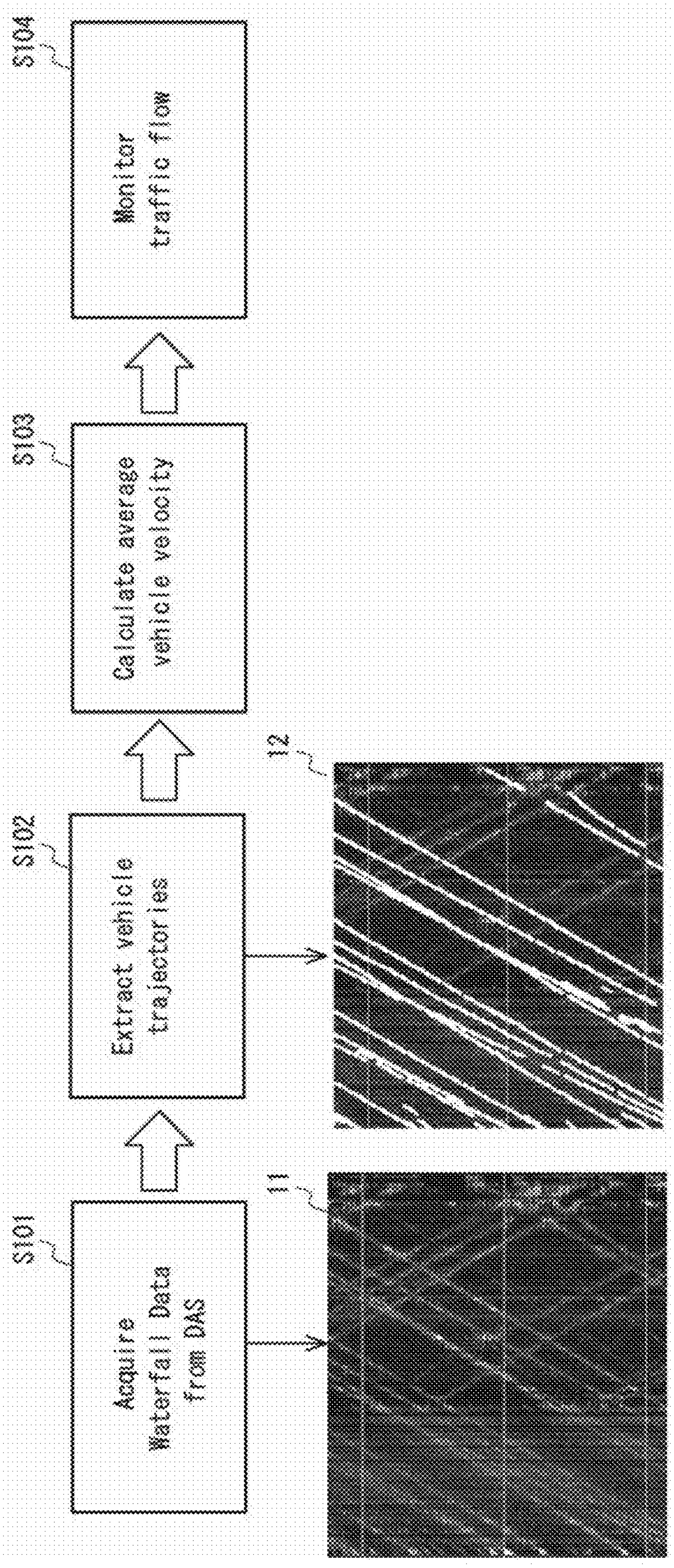
FIG. 2 is a flow chart of a related traffic monitoring method.

Next, problems of the related technology will be described with reference to FIGS. 2 to 6. FIG. 2 is a flowchart of a related traffic monitoring method. In the related method, first, waterfall data is acquired from the DAS 100 (step S101). An image 11 shows a pre-processed waterfall data. The raw waterfall data acquired is pre-processed. The vertical axis represents time, and the horizontal axis represents a position along the optical fiber 300. The waterfall data includes trajectories of vehicles 20. A vehicle trajectory is an identifiable line indicating the vibrations generated by a vehicle 20 crossing the road 10.

Next, trajectories of vehicles 20 are extracted from the waterfall data (step S102). An image 12 shows the result of extracting the trajectories of the vehicles 20 from the waterfall data shown in the image 11. In the image 12, the extracted trajectories of the vehicles 20 are highlighted. The trajectories of the vehicles 20 are extracted using, for example, a Deep Neural Network, DNN (e.g., U-Net).

Next, the average velocity (km/hr) of the vehicles 20 is calculated (step S103). Each vehicle velocity is calculated based on the slope of the corresponding trajectory. Finally, traffic monitoring is performed based on the average vehicle velocity (step S104). Specifically, the detection of traffic jam, congestion, or queue may be performed. The estimated average vehicle velocity which represents the traffic flow forms the base for traffic flow monitoring.

Figure 3:
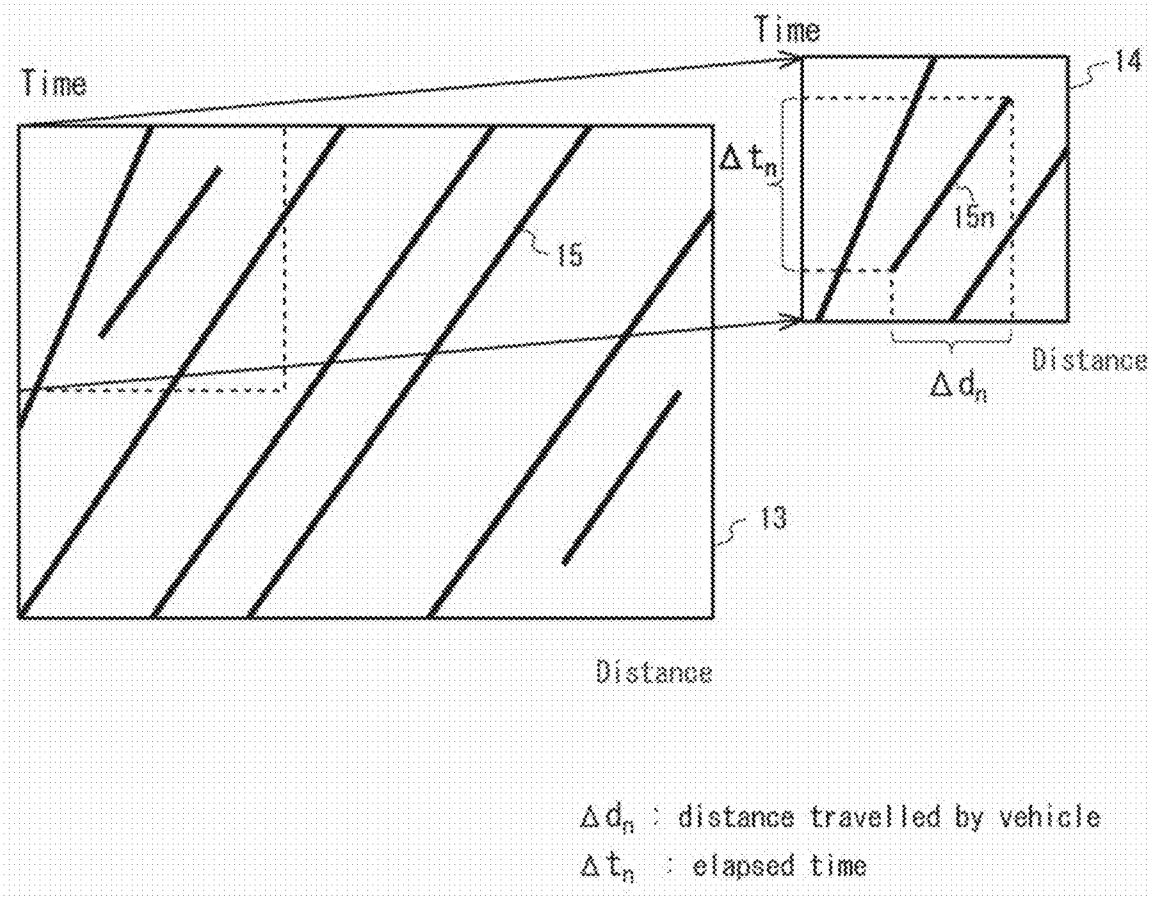
FIG. 3 is a schematic diagram of a patch.

Next, referring to FIG. 3, a related method for calculating the average velocity of the vehicles 20 in the related art will be described. FIG. 3 is a schematic diagram of waterfall data. Waterfall data can be separated into multiple patches. A reference sign 13 denotes entire waterfall data, and a reference sign 14 denotes a patch. The range of the patch 14 is indicated by dotted lines in the waterfall data 13. By separating waterfall data 13 into patches 14, traffic monitoring can be performed with high accuracy. A patch is considered depending on the flow resolution (time, distance) required. All the trajectories in the patch 14 may be considered for the average velocity.

The vertical axis indicates time, and the horizontal axis indicates a position along the optical fiber 300, that is, a distance travelled by each vehicle 20. The waterfall data 13 includes a plurality of trajectories 15. A patch 14 includes a trajectory 15*n*. Δdn indicates the length of the trajectory 15*n* in the distance direction, and Δtn indicates the length of the trajectory 15*n* in the time direction. Δdn represents a distance travelled by a vehicle 20, and Δtn represents the elapsed time of vehicle 10. Elapsed time is called a duration of time. An average vehicle velocity of the patch 14 is calculated by the following equation.

Average velocity=(sum of all distances travelled by vehicles)/(sum of all duration of time)

Figure 4:
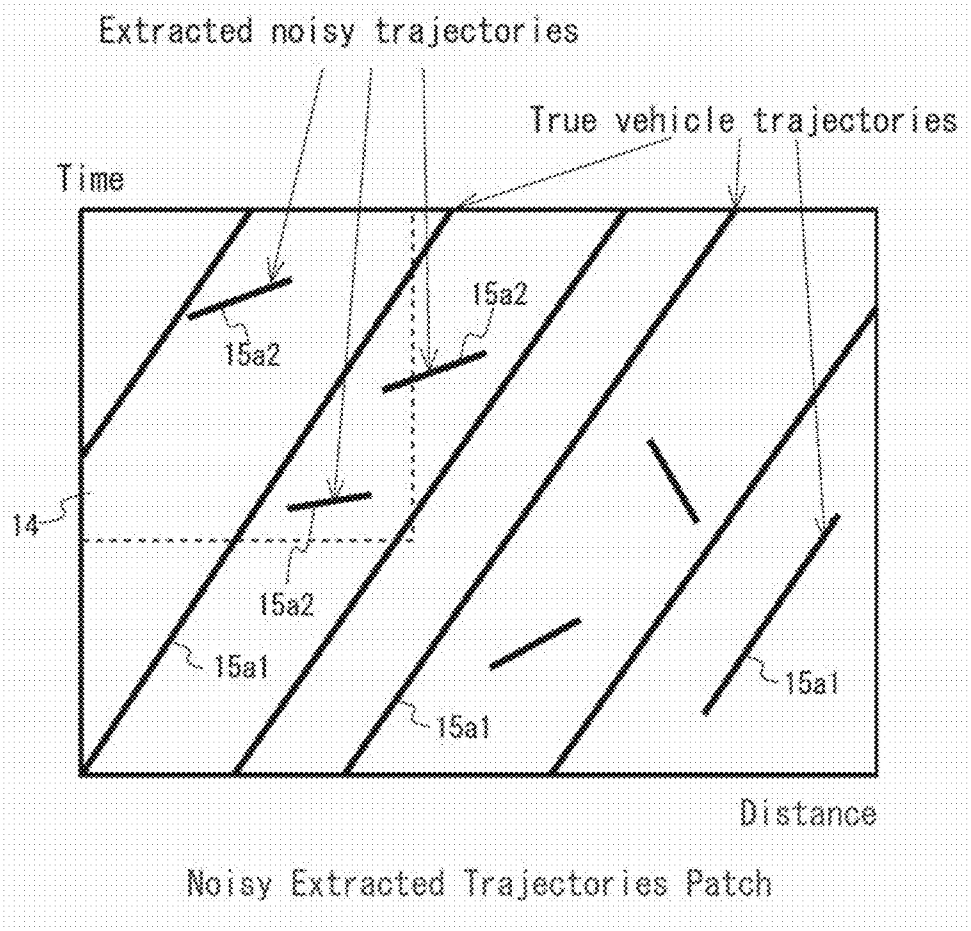
FIG. 4 is a schematic diagram showing noisy trajectories contained in the patch.

FIG. 4 illustrates trajectories included in the patch 14. The patch 14 surrounded by dotted lines is included in a waterfall data. The waterfall data includes trajectories 15*al* and 15*a*2. The trajectory 15*a*1 is a real trajectory derived from a vehicle 20. The trajectory 15*a*2 is a trajectory derived from extracted noise. Noisy trajectories can be due to presence of bridges, tunnels, or other structures on the highway/road considered for monitoring.

FIG. 5 is a table containing the results of calculating the average vehicle velocity from patch 14. FIG. 5 includes a measurement time and date 21, an average vehicle velocity 22 (km/hr) estimated from the waterfall data, and an average vehicle velocity 23 (km/hr) observed from a traffic counter, which is the reference/ground truth data. The traffic counter may include a loop coil.

When the measurement time and date 21 is T4 on D4, the average vehicle velocity 22 is 150.6 km/hr and the average vehicle velocity 23 is 95 km/hr. The average velocity 22 and the average velocity 23 are different. Noise affects estimated velocity The smaller the inclination (slope) of each trajectory included in the patch 14, the larger the average vehicle velocity is calculated. Referring to FIG. 4, it is considered that the average vehicle velocity 22 is calculated to be larger than the real velocity because the patch 14 includes the noisy trajectory 15*a*2 having a small inclination. Noisy trajectories contribute to the average vehicle velocity calculation and it results in false velocities. These false velocities may lead to insufficient traffic flow monitoring and reduce dependency.

Figure 6:
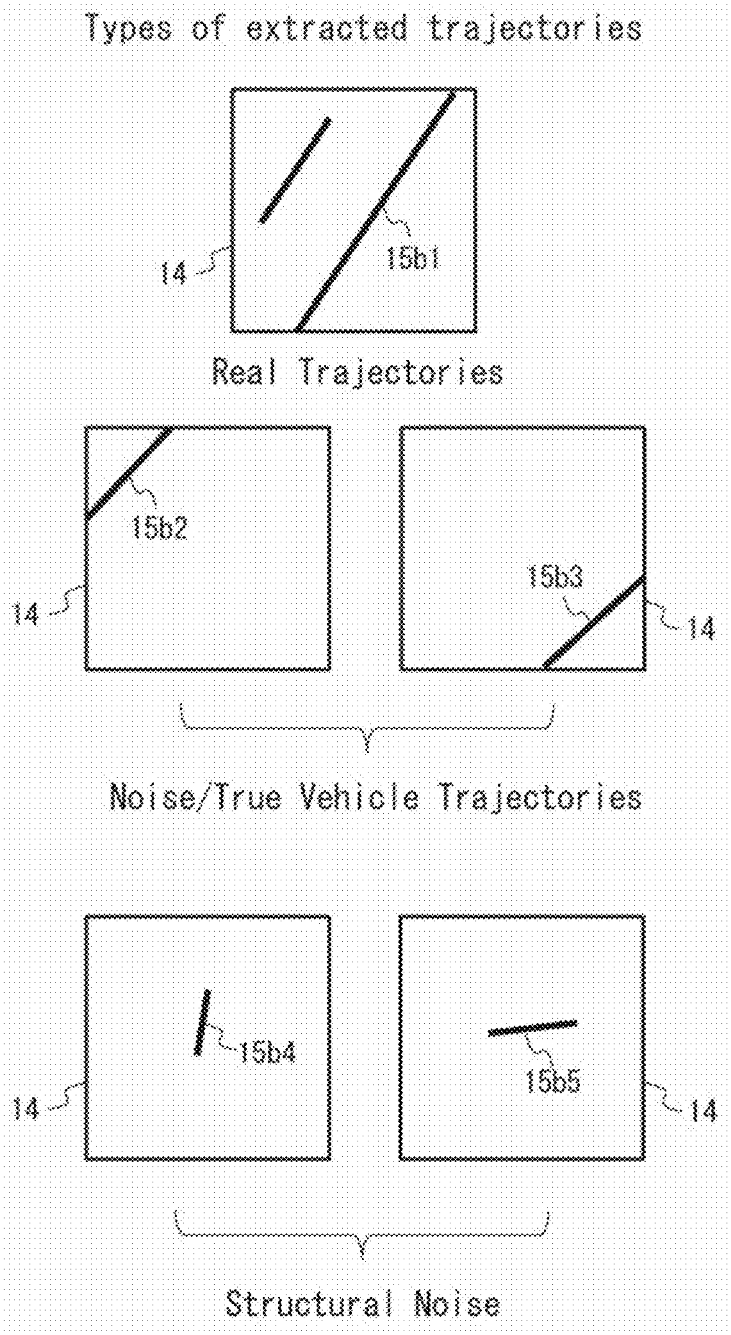
FIG. 6 is a schematic diagram illustrating trajectories included in the patch.

FIG. 6 shows examples of trajectories included in patch 14. FIG. 6 includes trajectories 15*b*1, 15*b*2, 15*b*3, 15*b*4, and 15*b*5. The trajectory 15*bl* is a real trajectory derived from the vibration of a vehicle 20. Since the trajectory 15*b*1 is sufficiently long, it can be determined that it is a real trajectory.

The trajectory 15*b*2 is included in the upper left side of the patch 14, and the trajectory 15*b*3 is included in the lower right side of the patch 14. Since the lengths of the trajectory 15*b*2 and 15*b*3 are short, the trajectories 15*b*2 and 15*b*3 may be noise or may be cut from real trajectories.

The trajectory 15*b*4 and the trajectory 15*b*5 are structural noise and are sufficiently short, hence, it can be determined that the trajectory 15*b*4 and the trajectory 15*b*5 are noisy trajectories. This type of noise may occur due to structures such as bridges or tunnels along highway. The trajectory 15*b*4 extends in the vertical direction, and there is a possibility that the average vehicle velocity is calculated lower. The trajectory **15*b*5** extends in the horizontal direction, and the average vehicle velocity may be calculated higher.

According to the related technology, there is a problem that the accuracy of calculating the average vehicle velocity is reduced because the patch 14 contains noise. Since a short trajectory (e.g., the trajectory **15*b*2 or the trajectory 15*b*3) in the patch 14** may be a part of a real trajectory, it is difficult to remove noise depending on the length of each trajectory. It is difficult to distinguish noisy trajectories from real trajectories solely based on the length of these trajectories.

Next, the configuration of the traffic monitoring device 200 will be described with reference to FIG. 7. The traffic monitoring device 200 comprises an acquisition unit 210, an extraction unit 220, a separation unit 230, a noise removing unit 240, and a traffic monitoring unit 250. The traffic monitoring device comprises a processor and a memory. Each function of the traffic monitoring device 200 may be realized by reading a program (not shown) into the memory such as a RAM and executing it by the processor.

An acquisition unit 210 acquires waterfall data from the DAS 100. An extraction unit 220 extracts a plurality of trajectories from the waterfall data. A separation unit 230 separates the waterfall data into a plurality of patches.

A noise removing unit 240 removes noise from the trajectories included in each patch. The noise removing unit 240 comprises a determination unit 241, an extension unit 242, a feature calculation unit 243, a detection unit 244, and a removing unit 245.

A determination unit 241 determines end coordinates of each of a plurality of trajectories extracted from waterfall data. As described above, the waterfall data is obtained by measuring signals from a plurality of sensing portions arranged along the road 10. The determination unit 241 outputs the determined end coordinates to the extension unit 242.

The extension unit 242 uses the end coordinates to extend each trajectory so that a duration of time of each trajectory becomes a reference duration of time. The reference duration of time may be a constant period of time.

Figure 8:
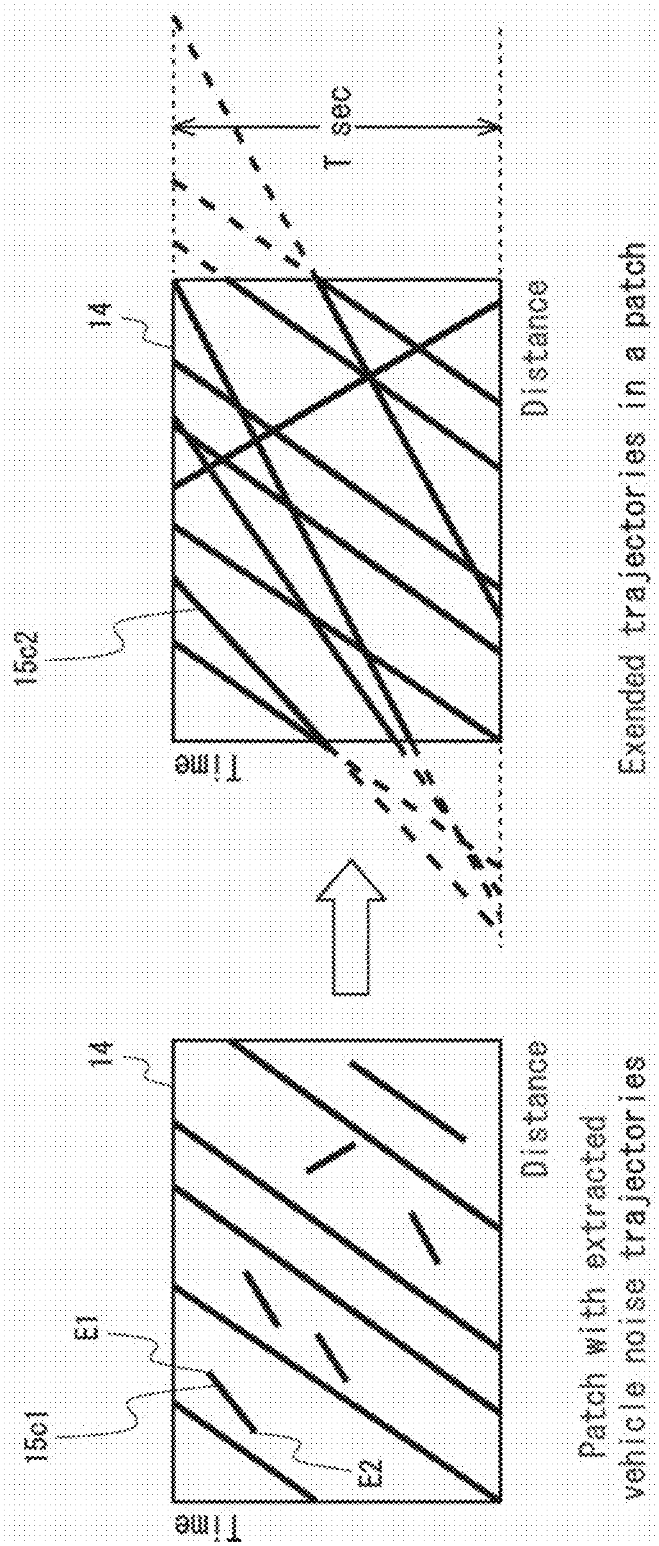
FIG. 8 is a schematic diagram illustrating a method to extend trajectories.

Next, referring to FIG. 8, the extension process performed by the extension unit 242 will be specifically described. The left side of FIG. 8 shows the patch 14 before the extension process is performed. The patch 14 includes a plurality of trajectories. The patch 14 includes a short trajectory (e.g., trajectory **15*c*1). The trajectory 15*c*1 includes end points E1 and E2**.

The right side of FIG. 8 shows the patch 14 after the extension process is performed. The extension unit 242 extends each trajectory so that the duration of time of each trajectory becomes a reference duration T (sec) of time. All trajectories in the patch 14 can be extended. The reference duration T of time is consistent with a time width of the patch 14. Note that the reference duration T of time and the time width of the patch 14 may be different. For the sake of clarity, the portion of each extended trajectory contained within patch 14 is shown as a solid line. The portion of each extended trajectory included outside the patch 14 is indicated by a dotted line. The trajectory **15*c*2 indicates the trajectory obtained by extending the trajectory 15*c*1**.

As described above, it is difficult to classify each trajectory as a real trajectory or noise, based on the length. This is because a real trajectory and a noisy trajectory may have equal lengths. The traffic monitoring device 200 extends each trajectory to the reference duration T of time in order to bring all trajectories to a common frame of reference. Thus, the length of each trajectory having the reference duration T of time can be determined. The length may be a line length or a length in the distance direction. The length of each extended trajectory is different between the real trajectory and the noisy trajectory. Thus, the removing unit 244 described later can remove an outlier trajectory (noisy trajectory).

Figure 9:
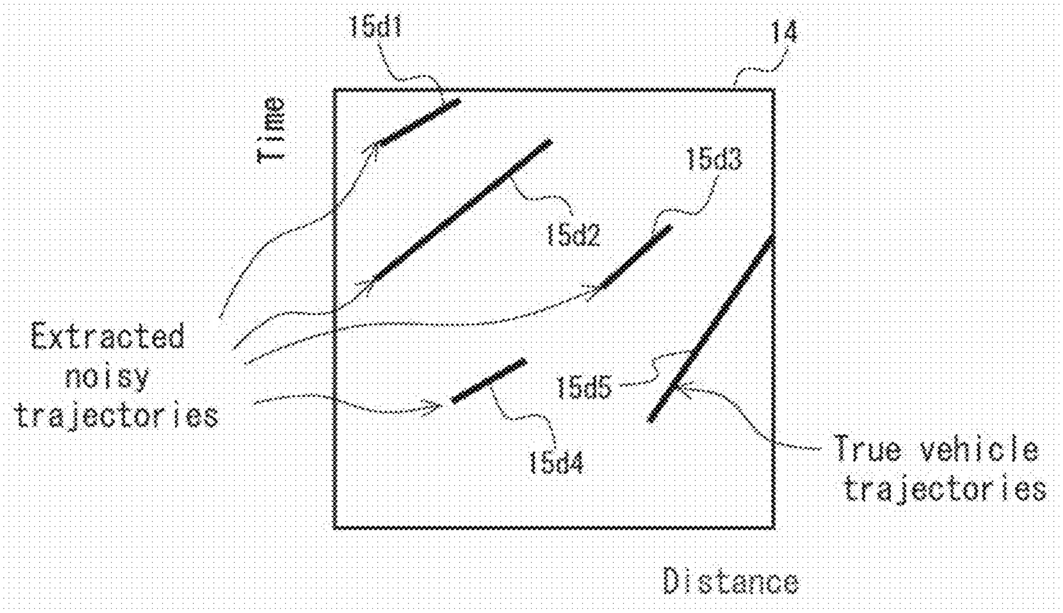
FIG. 9 illustrates reasons for extending trajectories.

Next, with reference to FIGS. 9 to 11, the reason why the extension unit 242 extends the trajectory will be described in detail. The patch 14 shown in FIG. 9 includes a trajectory **15*d*1, 15*d*2, 15*d*3, 15*d*4, and 15*d*5. The trajectories 15*dl*, 15*d*2, 15*d*3, and 15*d*4 are noisy trajectories. The trajectory 15*d*5 is a true trajectory derived from the vibration of the vehicle. The noisy trajectories are at different reference of time, in order to bring all the trajectories to a common reference, extension is performed. The trajectory 15*d*5 is longer than other noisy trajectories 15*d*1, 15*d*2, 15*d*3, and 15*d*4**, hence we can say that, the longer trajectories are more likely to be true vehicle trajectories. Therefore, the true vehicle trajectories will have higher extension ratio/weights.

Figure 10:
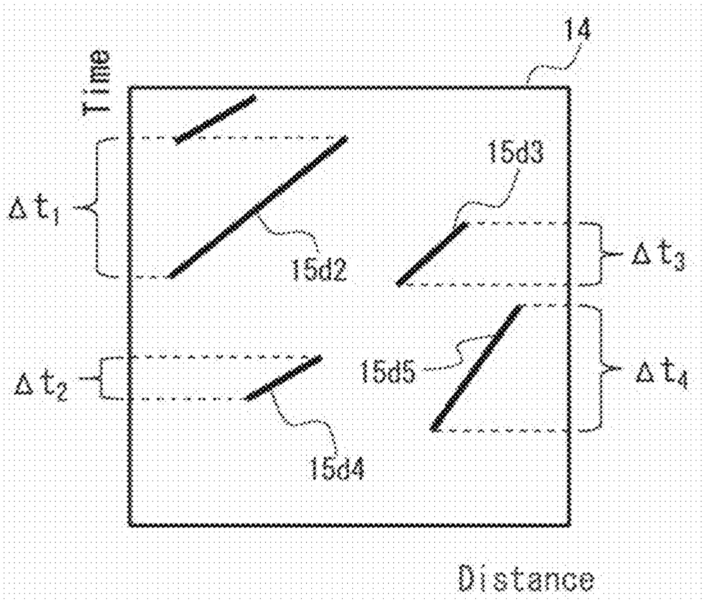
FIG. 10 illustrates reasons for extending trajectories.

FIG. 10 shows the length in the time direction of each trajectory included in the patch 14. Δt1 indicates the duration of time of the trajectory **15*d*2, Δt2 indicates the duration of time of the trajectory 15*d*3, Δt3 indicates the duration of time of the trajectory 15*d*4, and Δt4 indicates the duration of time of the trajectory 15*d*5. A duration of time is a trajectory length in the time direction. Δt1, Δt2, Δt3 and Δt4 are different from each other. A noisy trajectory (an outlier trajectory) cannot be determined by the lengths of the trajectory 15*d*2, 15*d*3, 15*d*4, and 15*d*5. Therefore, the traffic monitoring device 200** extends each trajectory so that the duration of time of each trajectory becomes the reference duration T of time.

Figure 11:
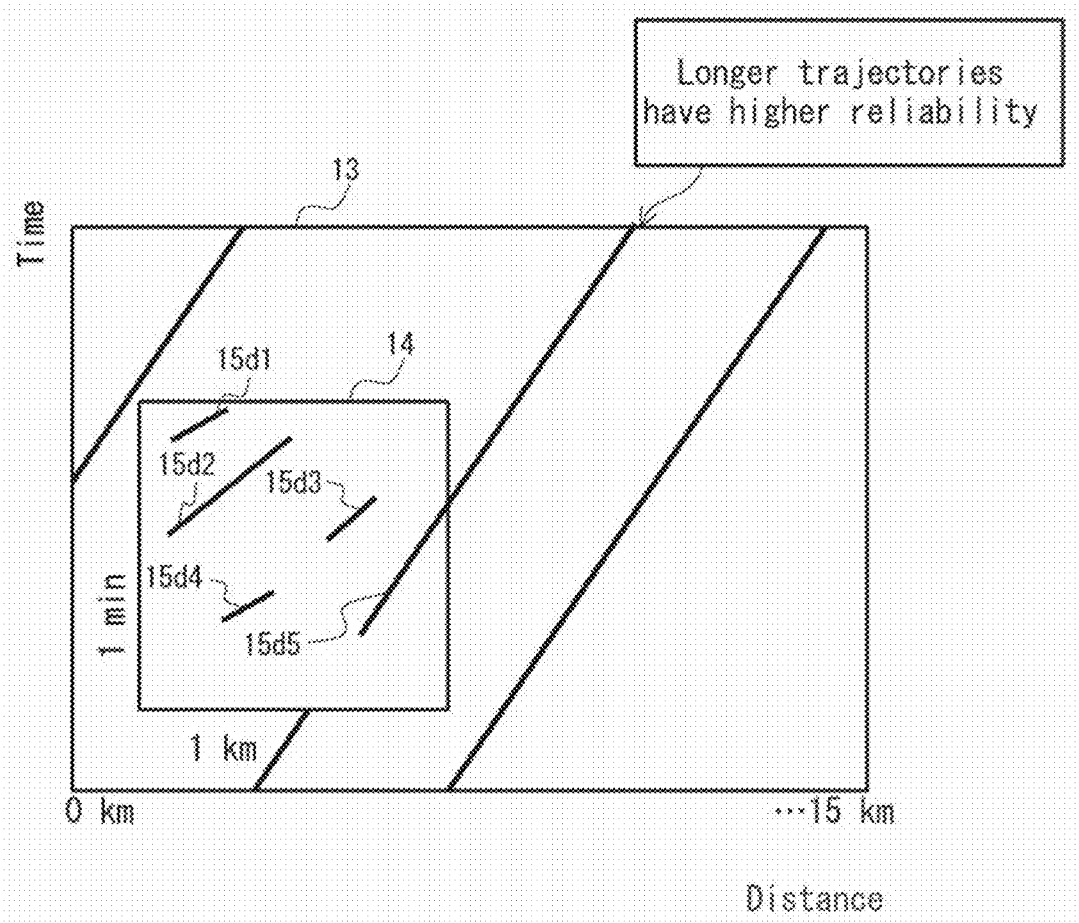
FIG. 11 illustrates reasons for extending trajectories.

FIG. 11 shows an entire waterfall data 13 including the patch 14. The horizontal axis represents distance (0-15 km) and the vertical axis represents time. The reliability of each trajectory can be estimated by comparing the extended trajectory with the waterfall data 13. For example, a trajectory generated by extending the trajectory **15*d*5 and a trajectory in the waterfall data 13 overlap. In such a case, the trajectory 15*d*5 is likely to be derived from real vehicle vibration. The trajectory 15*d*5** is a discontinuous vehicle trajectory and a part of larger trajectory. Therefore, extending trajectories is needed. Context is lost in a smaller patch, and a larger patch is required for outlier detection.

Figure 7:
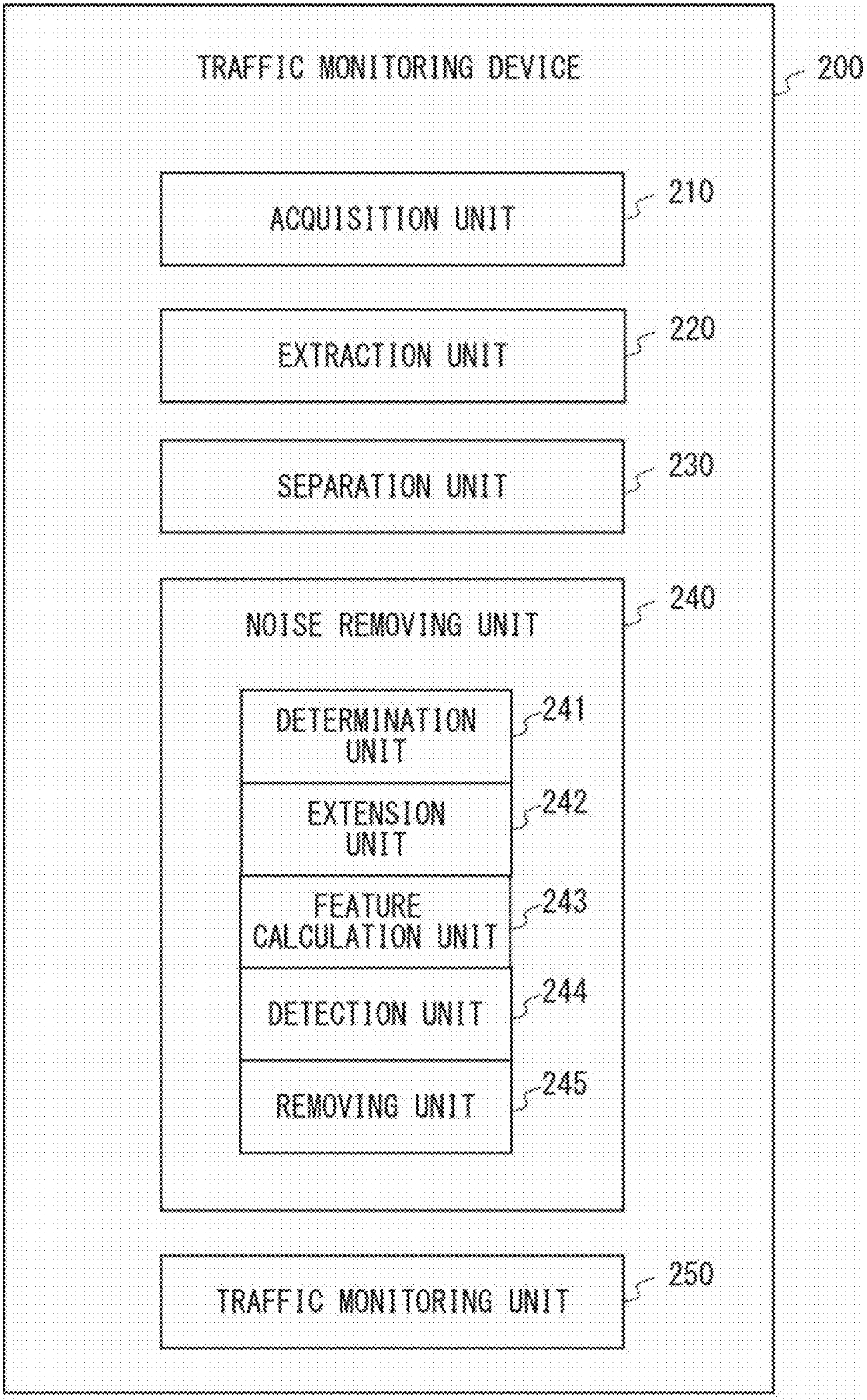
FIG. 7 is a block diagram illustrating a traffic monitoring device according to the first embodiment.

Referring to FIG. 7, the description will be continued. A feature calculation unit 243 calculates a feature of each extended trajectory. The feature is, for example, the length of each extended trajectory. The length of each extended trajectory may be a line length for a constant period of time (the reference duration of time). The velocity of a vehicle in a certain distance range and a certain duration range is within a given range. Therefore, the noise can be eliminated by calculating a parameter related to the velocity of the vehicle. The length of each extended trajectory in the distance direction is associated with velocity because it is the velocity multiplied by the reference duration T of time. As will be described later, the length of each extended trajectory is related to the velocity.

Figure 12:
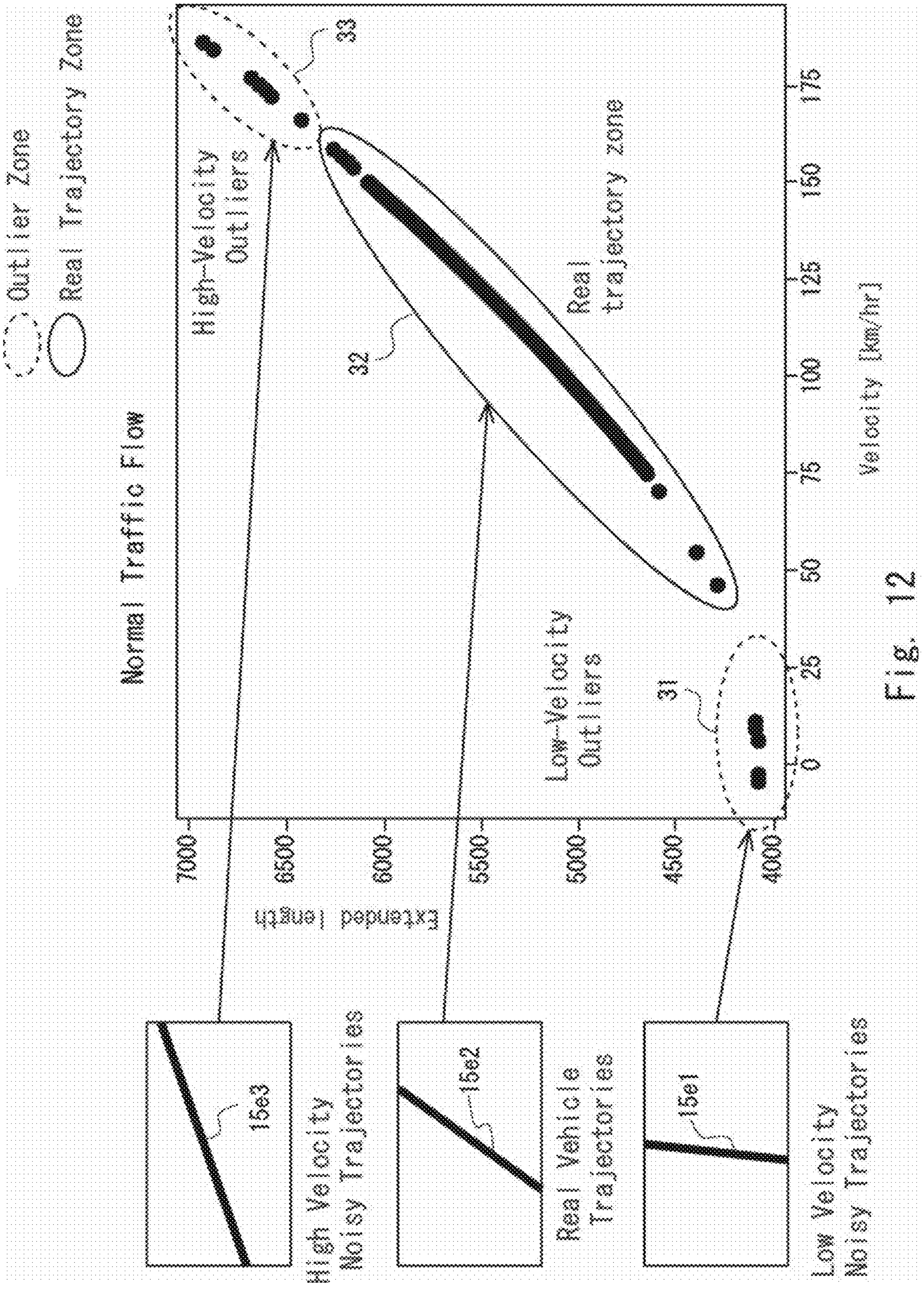
FIG. 12 shows a scatter plot of points corresponding to the extended trajectories.

Next, referring to FIG. 12, it will be described that the length of each extended trajectory can be used as a feature. FIG. 12 is a scatter plot in which the vertical axis shows the length of each extended trajectory, the horizontal axis shows the velocity corresponding to each trajectory, and the points corresponding to the extended trajectories are plotted. The points correspond to all trajectories in a patch. The velocity is calculated based on the slope of each trajectory. There is a correlation between the velocity and the extended length of the trajectory, and the longer the length, the greater the velocity. Thus, the length of each extended trajectory may be used as a feature.

The scatter plot includes zones 31, 32, and 33. The zone 31 includes low-velocity outlier trajectories. The zone 31 includes, for example, an extended trajectory **15*e*1 shown on the left side. The length of the extended trajectory 15*e*1 is smaller than the length of the extended trajectory 15*e*2** described later.

The zone 32 includes points corresponding to real vehicle trajectories. In the zone 32, the density of the points corresponding to the real vehicle trajectories is high. The zone 32 includes extended trajectories having mean length. The zone 32 includes, for example, an extended trajectory **15*e*2 shown on the left side. The length of the extended trajectory 15*e*2 is larger than the length of the extended trajectory 15*e*1 and smaller than the length of the extended trajectory 15*e*3** described later.

The zone 33 includes high-velocity outlier trajectories. The zone 33 includes, for example, an extended trajectory **15*e*3 shown on the left side. The length of the extended trajectory 15*e*3 is larger than the length of the extended trajectory 15*e*2**.

Figure 13:
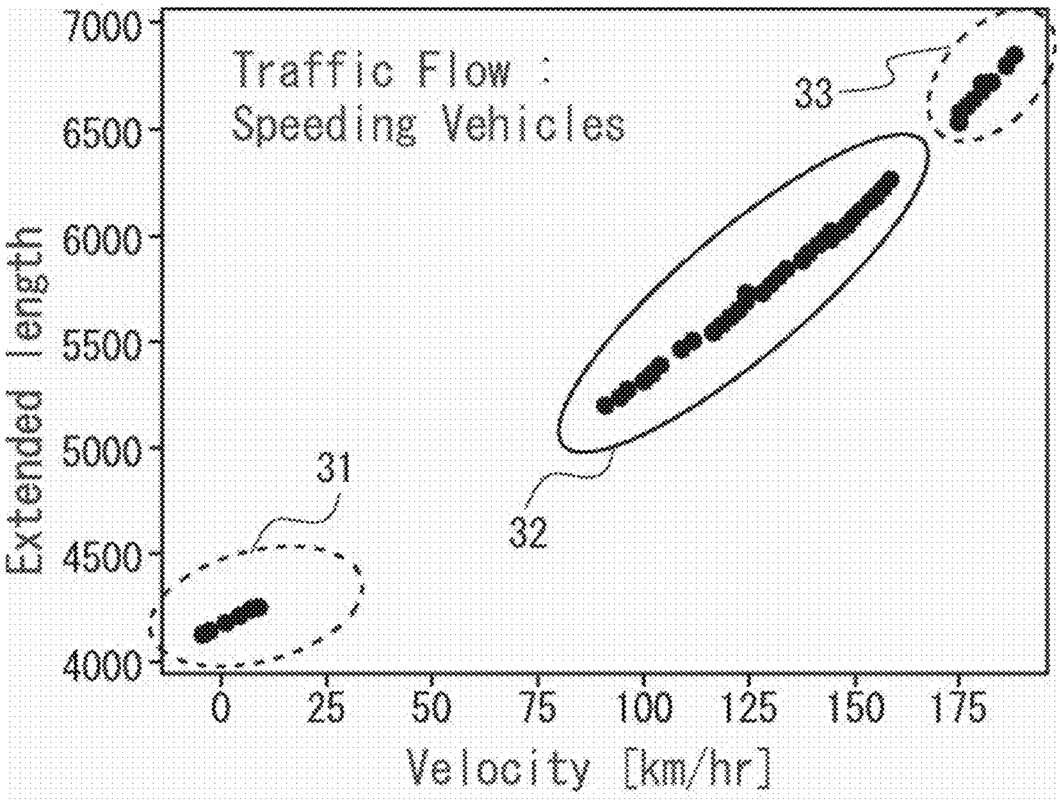
FIG. 13 is the scatter plot when traffic conditions on the road change.
Figure 14:
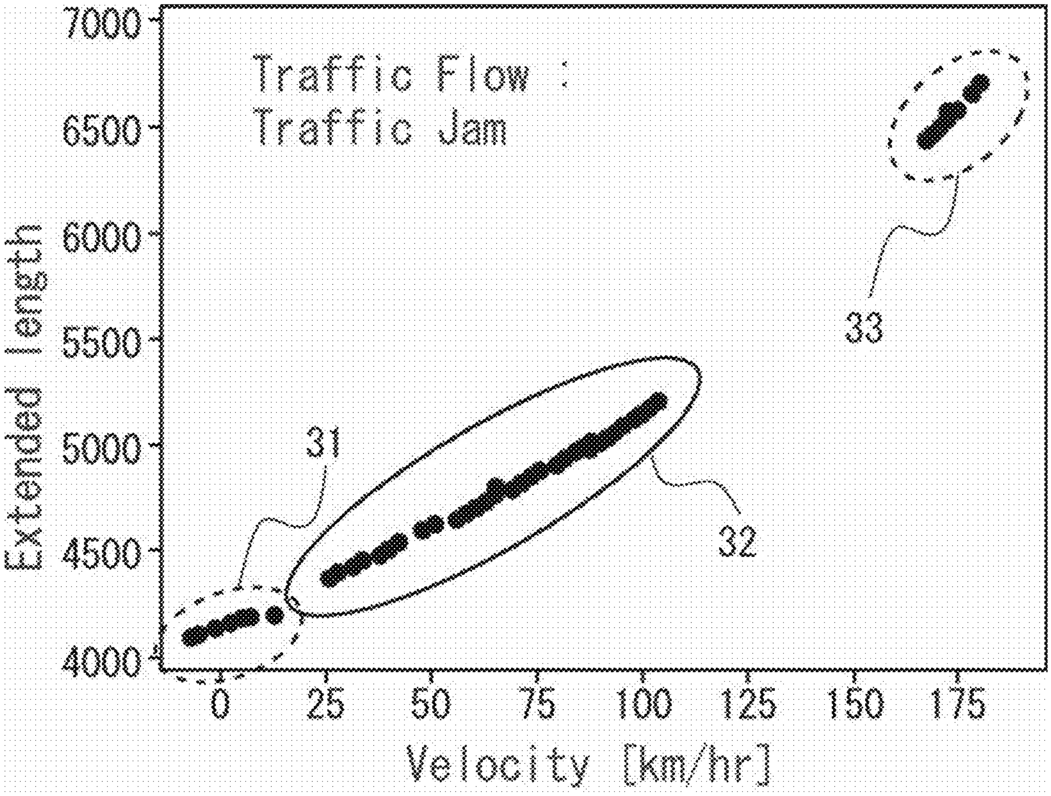
FIG. 14 is the scatter plot when traffic conditions on the road change.

FIG. 12 shows a length distribution of extended trajectories in normal traffic flow. As the traffic changes, the length distribution of the extended trajectories changes. FIG. 13 shows the length distribution of the extended trajectories when vehicles are moving at high velocity (speeding vehicles), with the zone 32 shifting to the upper right. FIG. 14 shows the length distribution of the extended trajectories when a traffic jam occurs, with the zone 32 shifting to the lower left.

Referring to FIG. 7, the description will be continued. The detection unit 244 detects outlier trajectory (outlier) from the plurality of trajectories on the basis of the features. The removing unit 245 removes the outlier trajectory from the plurality of trajectories.

A traffic monitoring unit 250 calculates an average vehicle velocity for each patch. The traffic monitoring unit 250 calculates velocity of a vehicle travelling on the road based on a slope of each trajectory and calculates the average velocity. The traffic monitoring unit 250 may calculate the average vehicle velocity by taking the reliability of each trajectory into account. As described with reference to FIG. 11, the reliability of each trajectory can be calculated by comparing each extended trajectory with the waterfall data. Specifically, the traffic monitoring unit 250 measures the length of a portion where each extended trajectory and any trajectory extracted from the waterfall data overlap each other. A traffic monitoring unit 250 derives a weighting coefficient corresponding to the length (trajectory length) and calculates an average velocity based on the weighting coefficient. The weighting coefficient is also referred to as an extension ratio. The extension ratio is calculated by the following equation.

Extension ratio=(trajectory length)/(extended trajectory length)

The extension ratio determined the weight of each trajectory. Longer continuous trajectories have higher weight for average velocity calculation.

Figure 15:
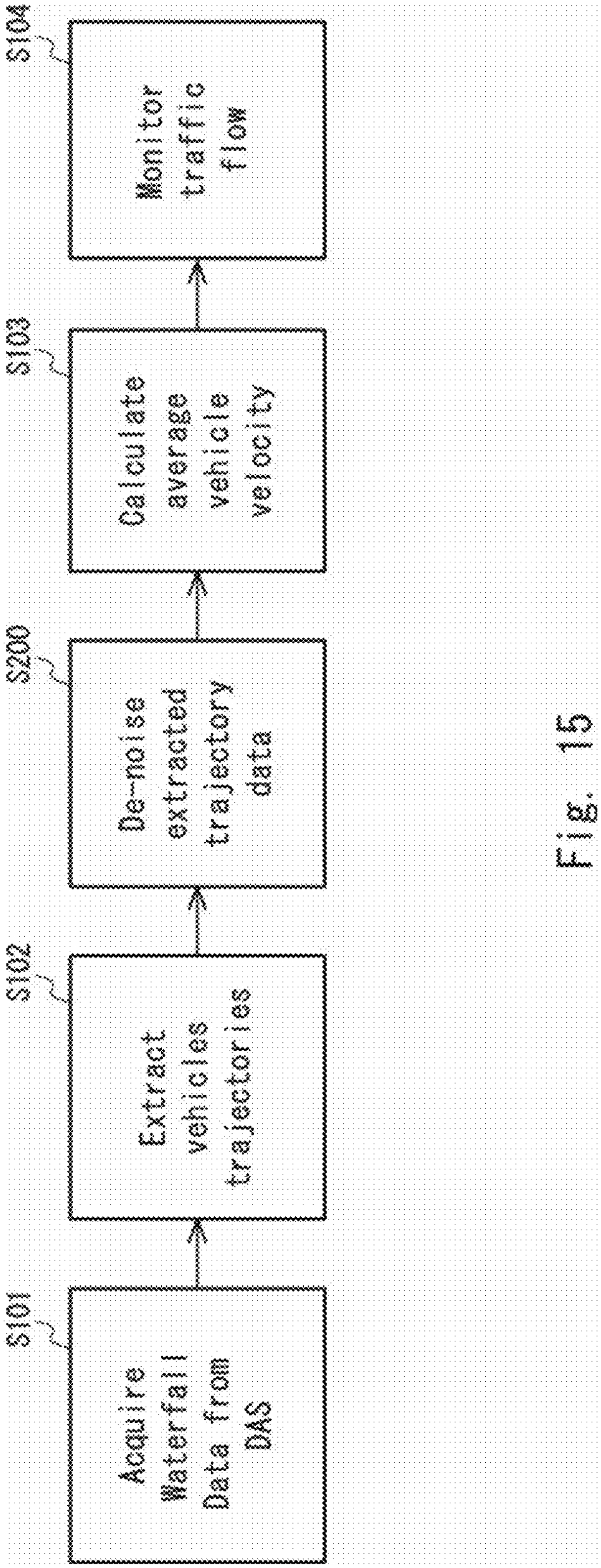
FIG. 15 is a flowchart of a de-noising method according to the first embodiment.

Next, a traffic monitoring method according to the first embodiment will be described with reference to FIG. 15. Comparing FIG. 2, which shows the related traffic monitoring method, with FIG. 15, a step 200 for removing noise is added. Steps S101 to S104 are the same as those in FIG. 2, and therefore description thereof is omitted. In step S200, a process for removing a noisy trajectory indicating noise from the plurality of trajectories extracted in step S102 is performed.

Figure 16:
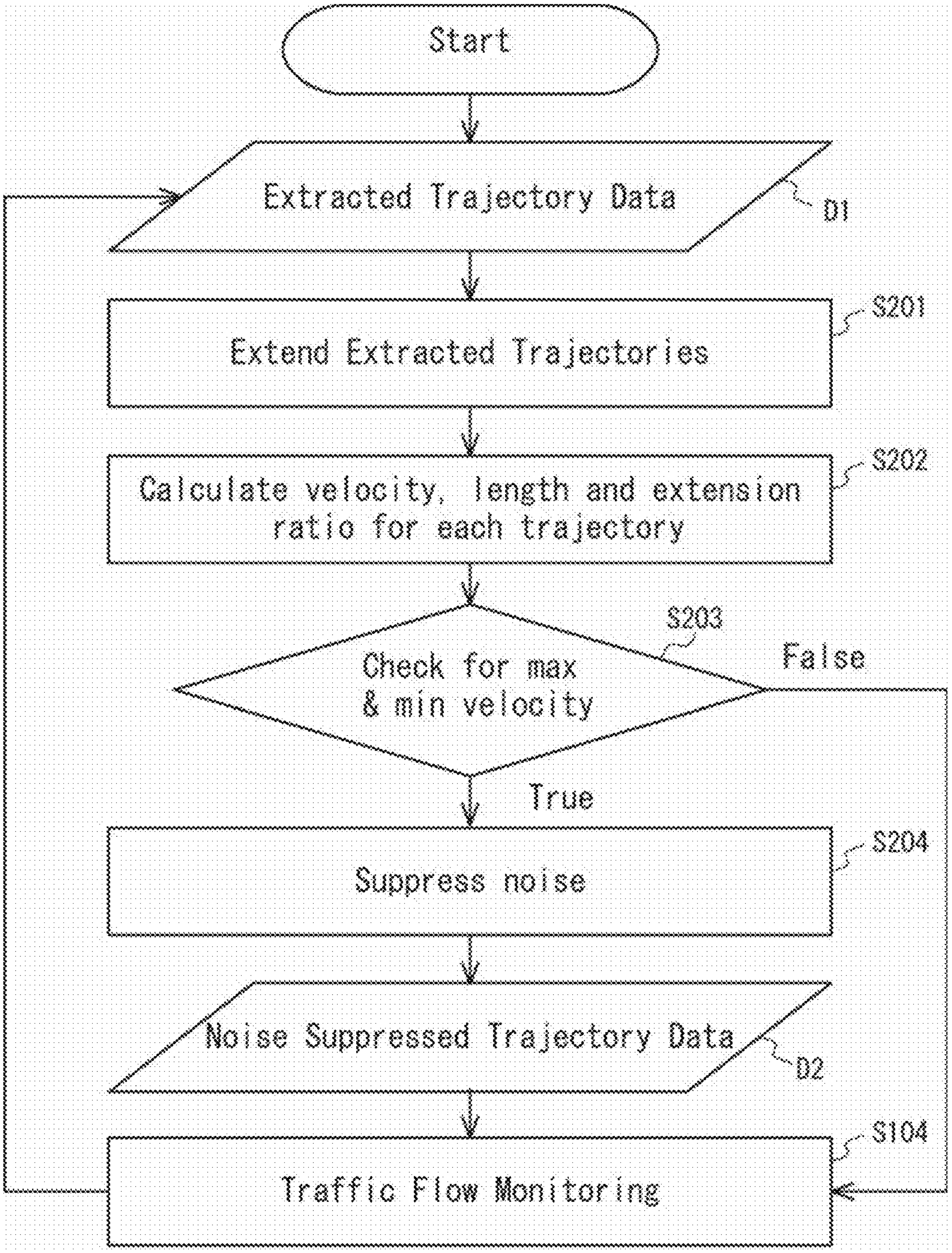
FIG. 16 is a flowchart showing an example of the flow of the de-noising method according to the first embodiment.

Next, an example of the traffic monitoring method according to the first embodiment will be described with reference to FIG. 16. First, data D1 including a plurality of trajectories extracted from the waterfall data is inputted.

Next, the extension unit 242 of the traffic monitoring device 200 extends each trajectory so that the duration of time of each trajectory becomes a reference duration of time (step S201). Before step S201, the determination unit 241 of the traffic monitoring device 200 may determine the end coordinates of each trajectory. Next, the traffic monitoring device 200 calculates the velocity corresponding to each trajectory, calculates the length of each trajectory, and calculates the extension rate of each trajectory (step S202).

Next, the traffic monitoring device 200 checks if the calculated average velocity exceeds a maximum threshold value, or less than a minimum threshold value (step S203). If it is false (No in step S203), the process proceeds to step S104 to monitor the traffic flow. If true (Yes in step S203), the process proceeds to step S204 to remove noise. The detection unit 244 of the traffic monitoring device 200 detects outlier trajectories from the plurality of trajectories based on the length of each trajectory calculated in step S202. A removing unit 245 of the traffic monitoring device 200 removes the outlier trajectory from the plurality of trajectories. In such a case, the traffic is monitored (step 104) using the trajectory data D2 from which the outlier trajectory is removed. The traffic monitoring unit 250 of the traffic monitoring device 200 may calculate the average velocity based on the data D2 and monitor the traffic flow.

Figure 17:
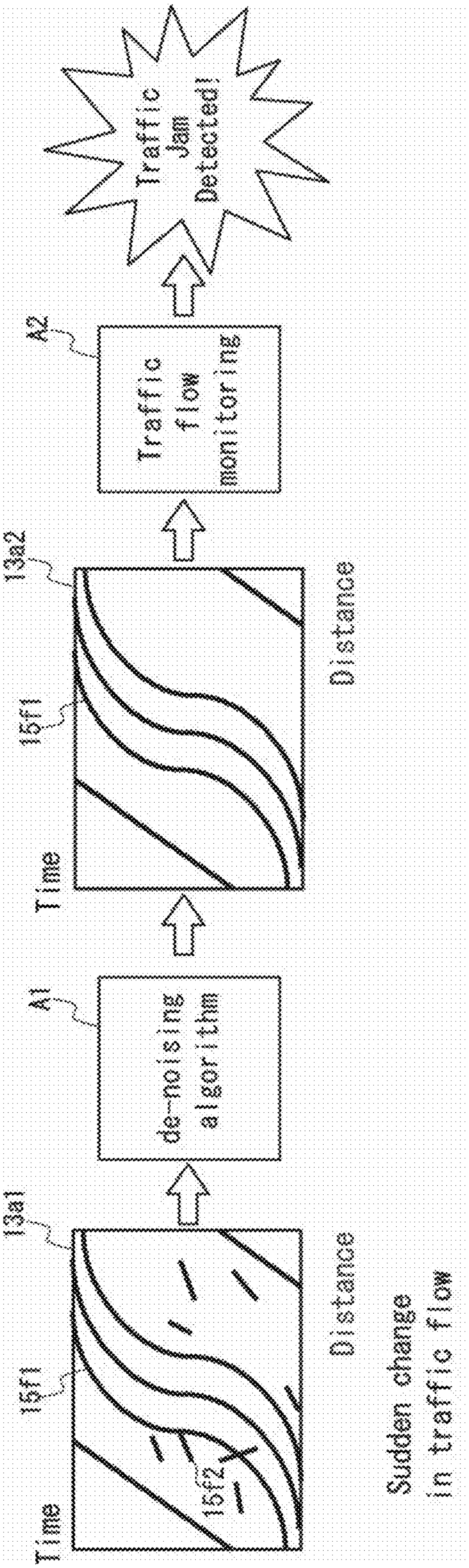
FIG. 17 is a schematic diagram for illustrating an effect of the first embodiment.
Figure 18:
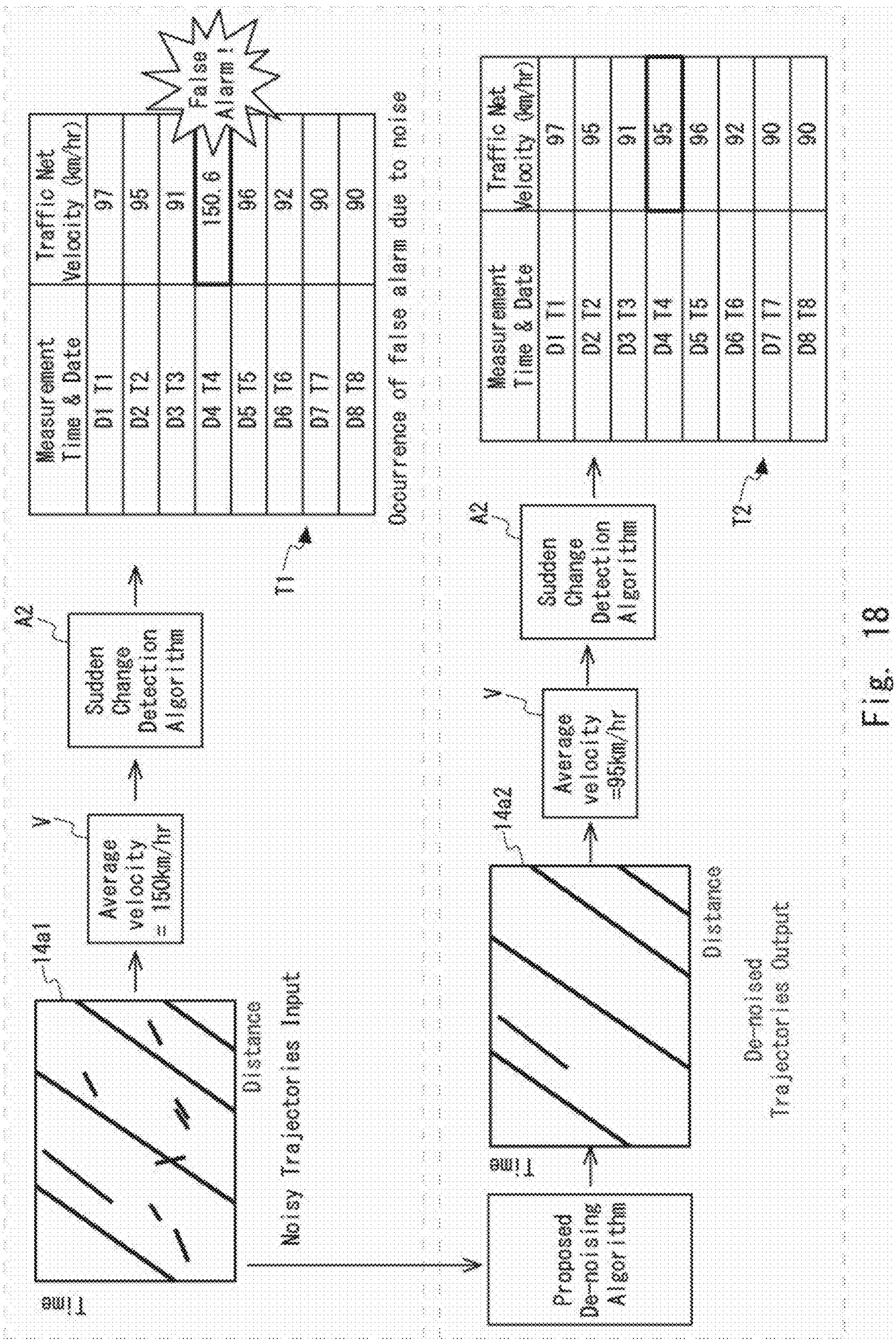
FIG. 18 is a schematic diagram for illustrating the effect of the first embodiment.

Next, referring to FIGS. 17 and 18, the effect of the traffic monitoring device 200 will be described. FIG. 18 includes waterfall data **13*a*1 acquired by the DAS 100. The waterfall data 13*a*1 includes abrupt changes (e.g., trajectory 15*f*1) in traffic flow. For example, a portion of the trajectory 15*f*1 having a large inclination corresponds to a traffic jam. However, the waterfall data 13*a*1 includes outlier trajectories (e.g., trajectory 15*f*2), and if the average vehicle velocity is measured for each patch, a traffic jam may not be detected. The traffic monitoring device 200 executes an algorithm A1 for removing noise from the waterfall data 13*a*1**.

The waterfall data **13*a*2 shows the data after the noise is removed. An algorithm A2 for performing traffic monitoring is executed based on the waterfall data 13*a*2** to detect a sudden change (e.g., traffic jam) in the traffic flow.

FIG. 18 shows the calculation results of the average vehicle velocity when the related technology is used and the calculation results of the average vehicle velocity when the first embodiment is used. The upper side of FIG. 18 includes a flow of the related technology, and the lower side includes a flow of the first embodiment.

Patch **14*a*1 shows a patch before noise is removed. The patch 14*a*1 includes a plurality of noisy trajectories. In the related technology, the average vehicle velocity V (e.g., 150.6 km/hr) is calculated from the all trajectories including the noisy trajectories. In such a case, when the algorithm A2 for detecting a sudden change in the traffic flow is applied, there is a problem that an erroneous alarm is outputted. Table T1** shows the results of calculating the average velocity using the related technique.

On the other hand, the traffic monitoring device 200 applies the de-noising algorithm A2 to the patch **14*a*1. Patch 14*a*2 shows a patch after removing noise from patch 14*a*1. The traffic monitoring device 200 calculates an average velocity V (e.g., 95 km/hr) from the trajectories not including a noisy trajectory. In such a case, when the algorithm A2 for detecting a sudden change in the traffic flow is applied, an erroneous alarm is not outputted. Table T2 shows the average velocity calculated by the traffic monitoring device 200**.

According to the first embodiment, the estimation accuracy of the average velocity is increased. Events such as accidents, traffic jam, etc. can be detected with high efficiency and false alarms can be reduced.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Although the embodiment of the present disclosure has been described above in detail, the present disclosure is not limited to the above-described embodiment, and modifications and changes to the above-described embodiment are included in the present disclosure to the extent that they do not deviate from the purpose of the present disclosure.

REFERENCE SIGNS LIST

1000 traffic monitoring system
100 DAS
200 traffic monitoring device
210 acquisition unit
220 extraction unit
230 separation unit
240 noise removing unit
241 determination unit
242 extension unit
243 feature calculation unit
244 detecting unit
245 removing unit
250 traffic monitoring unit
300 optical fiber
10 road
20 vehicle
11, 12 image
13, **13*a*1, 13*a*2** waterfall data
14 patch
15, **15*n*, 15*a*1, 15*a*2, 15*b*1, 15*b*2, 15*b*3, 15*b*4, 15*b*5, 15*c*1, 15*c*2, 15*d*1, 15*d*2, 15*d*3, 15*d*4, 15*e*1, 15*e*2, 15*e*3, 15*f*1, 15*f*2** trajectory
21 measurement time and date
22 average velocity
23 average velocity
31, 32, 33 zone
A1, A2 algorithm
E1, E2 end coordinate
T reference duration
T1, T2 table

The invention claimed is:

1. A device for reducing false alarms in traffic monitoring by obtaining noise-suppressed trajectory data, the device comprising:
at least one memory storing instructions and
at least one processor configured to execute the instructions to:
determine end coordinates of each of a plurality of trajectories extracted from waterfall data, the waterfall data being acquired by measuring signals from a plurality of sensing portions arranged along a road;
extend each trajectory by using the end coordinates so that a duration of time of each trajectory becomes a reference duration of time;
calculate a length of each extended trajectory;
detect an outlier trajectory from the plurality of trajectories based on the length of each extended trajectory;
remove the outlier trajectory from the waterfall data to obtain the noise-suppressed trajectory data; and
perform traffic flow monitoring based on the noise-suppressed trajectory data.

2. The device according to claim 1, wherein the at least one processor is further configured to execute the instructions to:
calculate velocity of a vehicle traveling on the road based on a slope of each trajectory and calculate an average velocity of vehicles traveling on the road.

3. The device according to claim 2, wherein the at least one processor is further configured to execute the instructions to:
separate the waterfall data into a plurality of patches,
determine the end coordinates of each trajectory included in each patch, and
calculate the average velocity for each patch.

4. The device according to claim 2, wherein the at least one processor is further configured to execute the instructions to:
measure a length of a portion where each extended trajectory and any trajectory extracted from the waterfall data overlap each other, derive a weighting coefficient according to the length of the portion, and calculate the average velocity based on the weighting coefficient.

5. A method of reducing false alarms in traffic monitoring by obtaining noise-suppressed trajectory data, comprising:
determining end coordinates of each of a plurality of trajectories extracted from waterfall data, the waterfall data being acquired by measuring signals from a plurality of sensing portions arranged along a road;
extending each trajectory by using the end coordinates so that a duration of time of each trajectory becomes a reference duration of time;
calculating a length of each extended trajectory;
detecting an outlier trajectory from the plurality of trajectories based on the length of each extended trajectory;
removing the outlier trajectory from the waterfall data to obtain the noise-suppressed trajectory data; and
performing traffic flow monitoring based on the noise-suppressed trajectory data.

6. A non-transitory computer readable medium storing a program for causing a computer to perform processes for reducing false alarms in traffic monitoring by obtaining noise-suppressed trajectory data, the processes including:
determining end coordinates of each of a plurality of trajectories extracted from waterfall data, the waterfall data being acquired by measuring signals from a plurality of sensing portions arranged along a road;

extending each trajectory by using the end coordinates so that a duration of time of each trajectory becomes a reference duration of time;

calculating a length of each extended trajectory;

detecting an outlier trajectory from the plurality of trajectories based on the length of each extended trajectory;

removing the outlier trajectory from the waterfall data to obtain the noise-suppressed trajectory data; and performing traffic flow monitoring based on the noise-suppressed trajectory data.

7. The device according to claim 1, wherein the at least one processor is further configured to execute the instructions to:

control an optical signal to be sent to an optical fiber; and acquire the waterfall data by detecting light returned from the optical fiber.

8. The method according to claim 5, further comprising:

controlling an optical signal to be sent to an optical fiber; and acquiring the waterfall data by detecting light returned from the optical fiber.

9. The non-transitory computer readable medium according to claim 6, wherein the processes further include:

controlling an optical signal to be sent to an optical fiber; and acquiring the waterfall data by detecting light returned from the optical fiber.

* * * * *